(12) United States Patent
Hamada et al.

(10) Patent No.: US 10,065,687 B2
(45) Date of Patent: Sep. 4, 2018

(54) COMPOSITE MATERIAL STRUCTURE

(71) Applicant: Nissan Motor Co., Ltd.

(72) Inventors: Yukihiro Hamada, Kanagawa (JP);
Hiroshi Ookubo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/546,022

(22) PCT Filed: Feb. 16, 2015

(86) PCT No.: PCT/JP2015/054103
§ 371 (c)(1),
(2) Date: Jul. 25, 2017

(87) PCT Pub. No.: WO2016/132425
PCT Pub. Date: Aug. 25, 2016

(65) Prior Publication Data
US 2018/0022395 A1    Jan. 25, 2018

(51) Int. Cl.
*B62D 29/00* (2006.01)
*B62D 25/20* (2006.01)
(Continued)

(52) U.S. Cl.
CPC .............. *B62D 29/005* (2013.01); *B32B 3/26* (2013.01); *B32B 3/263* (2013.01); *B32B 3/266* (2013.01); *B32B 3/28* (2013.01); *B32B 5/028* (2013.01); *B32B 5/142* (2013.01); *B32B 7/12* (2013.01); *B32B 15/016* (2013.01); *B32B 15/08* (2013.01); *B32B 15/14* (2013.01); *B32B 27/08* (2013.01); *B62D 25/20* (2013.01);
(Continued)

(58) Field of Classification Search
CPC ........... B32B 15/08; B32B 15/14; B32B 3/28; B32B 3/263; B32B 3/266; B32B 3/30; B32B 7/12; B62D 29/005; B62D 25/20
USPC ...... 52/783.1, 783.11, 783.17; 428/166, 188, 428/181, 186, 178, 457, 458, 113, 105, 428/297.4, 298.1, 299.1, 299.4
See application file for complete search history.

(56) References Cited

U.S. PATENT DOCUMENTS

| 4,888,247 A | 12/1989 | Zweben et al. |
| 6,468,613 B1 | 10/2002 | Kitano et al. |
| 2003/0008105 A1 | 1/2003 | Haack et al. |
| 2009/0202776 A1 | 8/2009 | Brandon et al. |

(Continued)

FOREIGN PATENT DOCUMENTS

| CN | 104197115 A | 12/2014 |
| JP | 50-45375 | 5/1975 |

(Continued)

*Primary Examiner* — Catherine A. Simone
(74) *Attorney, Agent, or Firm* — Global IP Counselors, LLP

(57) ABSTRACT

A composite material structure is provided a metal member and a resin member. The metal member is formed in a planar shape that has a main surface. The resin member is bonded to the main surface of the metal member. The metal member has a thermal expansion coefficient in a first direction along the main surface is larger than a thermal expansion coefficient in a second direction along the main surface. The second direction is orthogonal to the first direction. The resin member is formed of a fiber-reinforced resin having a fiber quantity in the second direction that is larger than a fiber quantity in the first direction.

6 Claims, 5 Drawing Sheets

(51) Int. Cl.
  *B32B 15/08*  (2006.01)
  *B32B 15/14*  (2006.01)
  *B32B 3/28*   (2006.01)
  *B32B 7/12*   (2006.01)
  *B32B 5/02*   (2006.01)
  *B32B 5/14*   (2006.01)
  *B32B 15/01*  (2006.01)
  *B32B 27/08*  (2006.01)
  *B32B 3/26*   (2006.01)

(52) U.S. Cl.
  CPC ....... *B32B 2250/03* (2013.01); *B32B 2250/40* (2013.01); *B32B 2307/706* (2013.01); *B32B 2307/732* (2013.01); *B32B 2605/00* (2013.01); *B32B 2605/003* (2013.01); *B32B 2605/08* (2013.01)

(56) References Cited

U.S. PATENT DOCUMENTS

2013/0233972 A1    9/2013  Alderliesten et al.
2015/0197068 A1*   7/2015  Newaz .................... B32B 5/245
                                                      428/174

FOREIGN PATENT DOCUMENTS

| JP | 63-102927  A | 5/1998 |
| JP | 2001-88793 A | 4/2001 |
| JP | 2011-79221 A | 4/2011 |
| JP | 2015-24679 A | 2/2015 |
| WO | 99/10168 A1  | 3/1999 |

* cited by examiner

COMPOSITE MATERIAL STRUCTURE

CROSS-REFERENCE TO RELATED APPLICATIONS

This application is a U.S. National stage application of International Application No. PCT/JP2015/054103, filed Feb. 16, 2015.

BACKGROUND

Field of the Invention

The present invention relates to a composite material structure of metal and fiber-reinforced resin.

Background Information

In order to efficiently absorb an input load from the outside, a technique to bond carbon fiber-reinforced plastic (CFRP) to a load receiving part made of light metal, such as aluminum, aluminum alloy, magnesium, or magnesium alloy, has been disclosed (refer to International Publication No. 99/10168—Patent Document 1).

SUMMARY

However, in the technique disclosed in Patent Document 1, since the thermal expansion coefficients of the light metal and the CFRP are different, a special adhesive is necessary in order to absorb the difference in the amount of elongation deformation due to heat after bonding, and it is difficult to mold the light metal with the matrix resin of the CFRP.

In view of the problems described above, an object of the present invention is to provide a composite material structure capable of reducing the effect of the difference in thermal expansion coefficients between metal and fiber-reinforced resin.

The composite material structure comprises a metal member and a resin member. The metal member is planarly formed such that the thermal expansion coefficient in a first direction along a main surface is larger than the thermal expansion coefficient in a second direction along the main surface that is orthogonal to the first direction. The resin member, made of fiber-reinforced resin, is bonded to the main surface of the metal member and is formed such that the fiber quantity along the second direction is larger than the fiber quantity along the first direction.

DETAILED DESCRIPTION OF THE EMBODIMENTS

Illustrative embodiments of the present invention will be described with reference to the drawings. In the explanations of the drawings, the same or similar elements are given the same or similar reference symbols, and overlapping explanations are omitted. The drawings are schematic, and the relationships and the ratios of the dimensions can be different from actual ratios.

Figure 1:
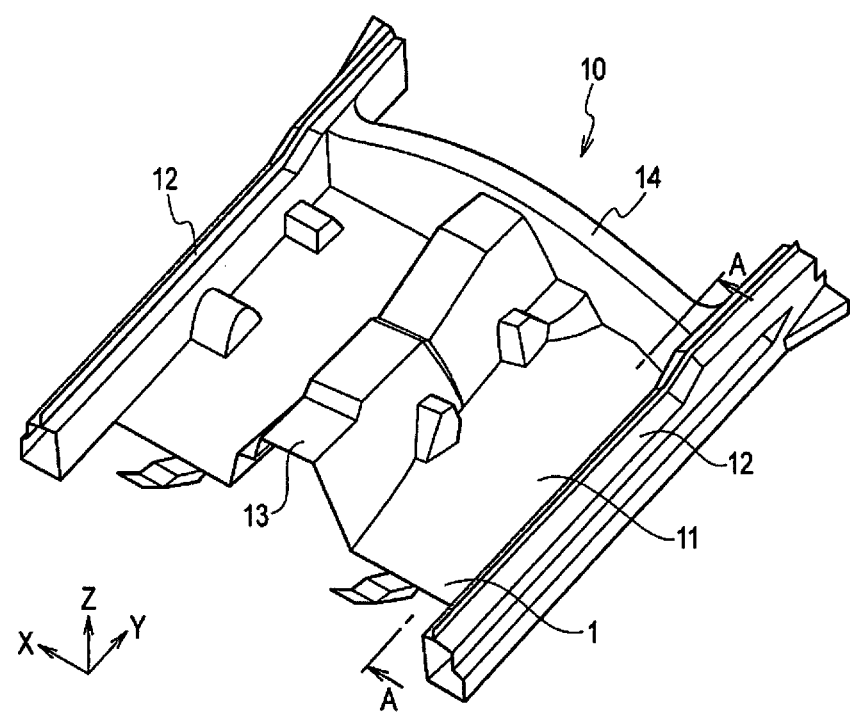
FIG. 1 is a perspective view illustrating a floor panel of an automobile comprising a composite material structure according to an embodiment of the present invention.
Figure 2:
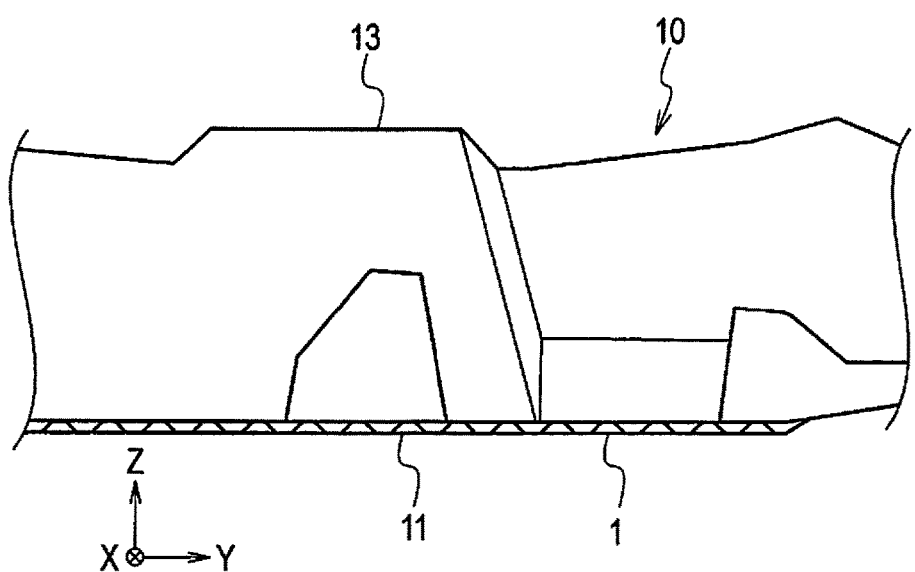
FIG. 2 is a partial, cross-sectional view taken along line A-A in FIG. 1.

The composite material structure 1 according to the embodiment of the present invention is applied to, for example, a floor panel 11 provided in a car body front part 10 of an automobile, as illustrated in FIGS. 1 and 2. Alternatively, the composite material structure 1 can be applied to a dash panel or a roof panel of the car body, or can be applied to a side shell 12, a floor tunnel 13, or a cross member 14 provided on the car body front part 10.

Figure 3:
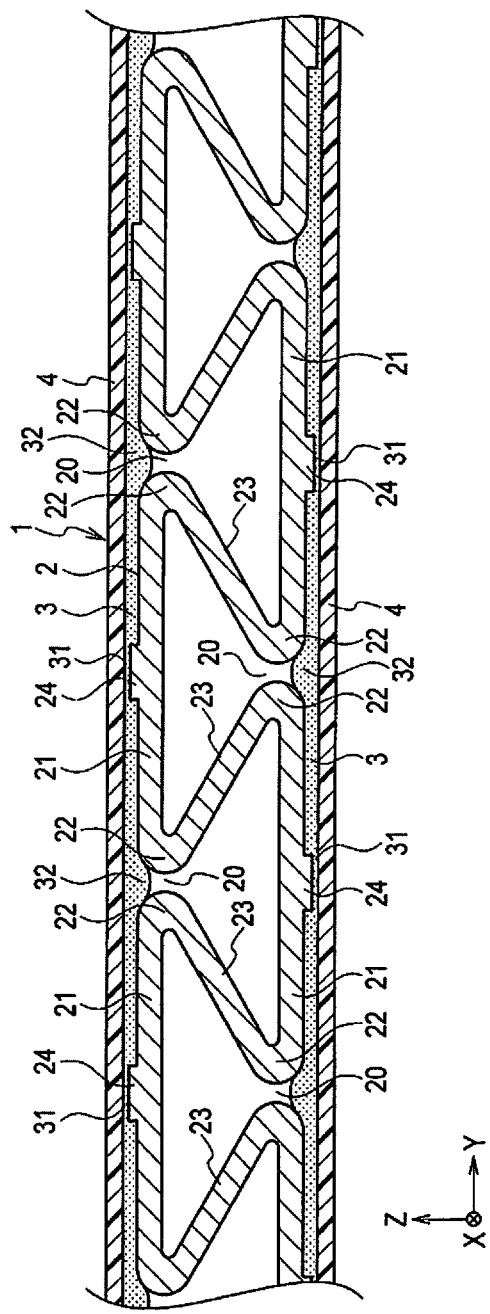
FIG. 3 is a cross-sectional view illustrating the composite material structure according to the embodiment of the present invention.

The composite material structure 1 comprises a metal member 2 that is formed of metal with a planarly shape and sheet-like resin members 4 that are made of fiber-reinforced resin and bonded to both main surfaces of the metal member 2, as illustrated in FIG. 3. The metal member 2 is made of a light metal, such as aluminum, aluminum alloy, magnesium, or magnesium alloy. The resin members 4 are made of fiber-reinforced resin having a smaller thermal expansion coefficient than the material of the metal member 2, such as carbon fiber-reinforced plastic (CFRP).

The metal member 2 is formed such that the thermal expansion coefficient in a first direction (X-axis direction) along a main surface is larger than the thermal expansion coefficient in a second direction (Y-axis direction) along the main surface and that is orthogonal to the first direction. The metal member 2 is formed by, for example, extrusion molding wherein the first direction is the extrusion direction of metal. The metal member 2 can be formed by other processing methods, such as bending or casting.

The metal member 2 is formed such that the cross-sectional shape, as viewed from the first direction, is uniform. The metal member 2 comprises a plurality of main surface portions 21, the outside surfaces of which constitute the main surface of the metal member 2, and a plurality of connecting portions 23 that connect to the end portions 22 of the main surface portions 21 on the other surface side, by being bent at each of the end portions 22 in the second direction of the main surface portions 21. The main surface portions 21 and the connecting portions 23 are each planarly shaped. By being connected as to be bent at the end portions 22, the main surface portions 21 and the connecting portions 23 can enhance the strength of the metal member 2 in a third direction (Z-axis direction), which is orthogonal to the first direction and the second direction.

The main surface portions 21 are disposed on each of the two surface sides of the metal member 2 in the third direction, such that the end portion 22 and the end portion 22 of another adjacent main surface portion 21 are each separated by a gap 20. That is, the metal member 2 is formed such that the main surfaces are continuous in the first direction and discontinuous in the second direction.

The two main surfaces of the metal member 2 and the resin members 4 are bonded to each other by an adhesive 3. The adhesive 3 has several thin walled portions 31 formed to have a smaller thickness than the other portions. The thin walled portions 31 are formed by thick walled portions 24 that are formed on the outer side surface of the main surface portions 21 to have a larger thickness than the other portions. The thick walled portions 24 and the thin walled portions 31 are periodically positioned in the second direction. The thick walled portions 24 are, for example, located in a central portion of each of the main surface portions 21 in the second direction.

The adhesive 3 has anchor portions 32 that protrude in the inner side direction, formed by the adhesive entering the gaps 20 between two opposing ones of the end portions 22. The adhesive 3 generates an anchor effect by having the anchor portions 32 that are between two opposing ones of the end portions 22 to enhance the bonding force with respect to the metal member 2.

Figure 4:
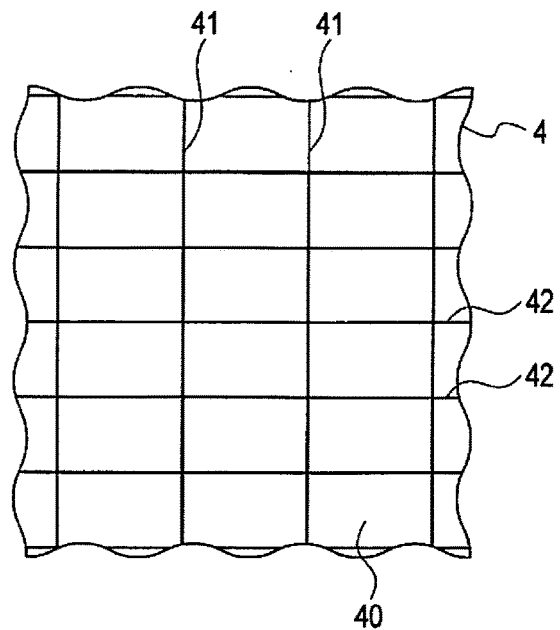
FIG. 4 is a plan view illustrating a resin material provided to the composite material structure according to the embodiment of the present invention.

The resin members 4 are formed such that a quantity of the fiber 42 along the second direction is larger than a quantity of the fiber 41 along the first direction, as illustrated in FIG. 4. That is, the resin members 4 are formed such that the thermal expansion coefficient in the second direction is larger than the thermal expansion coefficient in the first direction.

Figure 5:
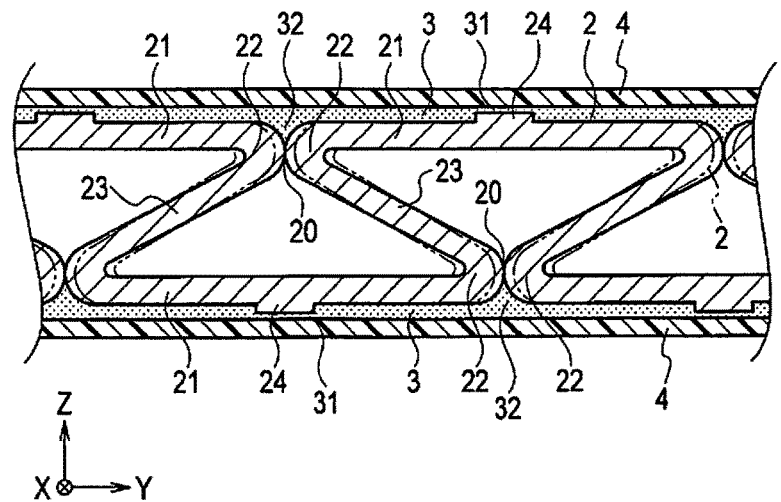
FIG. 5 is a cross-sectional view illustrating a state in which thermal expansion has occurred in the metal material provided to the composite material structure according to the embodiment of the present invention.

When the composite material structure 1 is heated, thermal expansion occurs in the metal member 2, as illustrated in FIG. 5. In FIG. 5, the metal member 2 before thermal expansion is illustrated by the chain double-dashed lines, and the metal member 2 after thermal expansion is illustrated by the solid lines. When the main surface portion 21 is thermally expanded, the main surface portion is elongated in the second direction, and the gaps 20 between two opposing ones of the end portions 22 becomes narrow. The gaps 20 function as a margin at the time of thermal expansion, the thermal expansion coefficient of the metal member 2 in the second direction becomes smaller than the thermal expansion coefficient in the first direction.

The adhesive 3 strongly bonds the metal member 2 and the resin members 4 at the thin walled portions 31. When the composite material structure 1 is heated, since the metal member 2 has a larger thermal expansion coefficient than the resin members 4, the adhesive 3 in the thickly formed regions, excluding the thin walled portions 31, undergoes shearing deformation that is greater than in the thin walled portions 31 between the main surface portions 21 and the resin members 4. By undergoing shearing deformation, the adhesive 3 functions as a buffer layer that absorbs the difference in the amount of displacement, caused by thermal expansion, between the metal member 2 and the resin members 4. Since the thin walled portions 31 are positioned in the central portion of each of the main surface portions 21 in the second direction, the shearing deformation is small, and the damage is small.

The gaps 20 are formed to have a width with which the matrix resin 40 of the resin member 4 and the adhesive 3 (refer to FIG. 4) do not intrude into the region that surpasses the main surface portion 21 of the metal member 2 (the region between the connecting portions 23). The widths of the gaps 20 are, for example, several mm, and can be about 1-2 mm, when the width of each of the main surface portions 21 in the second direction is about 20-30 mm. The gaps 20 prevent the matrix resin 40 from flowing in the inner side direction of the metal member 2, when molding the matrix resin 40 against the metal member 2, to which the fibers 41, 42 are disposed.

According to the composite material structure 1 according to the embodiment of the present invention, since the metal member 2 and the resin members 4 are bonded such that the fibers 42 are densely oriented along the direction in which the thermal expansion coefficient of the metal member 2 is small, it is possible to reduce the effect of the difference in the thermal expansion coefficients between the metal and the fiber-reinforced resin. Therefore, other than a special adhesive becoming unnecessary when using an adhesive, it becomes easy to mold the matrix resin 40 against the metal member 2 (resin transfer molding: RTM).

In addition, according to the composite material structure 1, since the main surfaces of the metal member 2 are formed as continuous in the first direction and discontinuous in the second direction, it is possible to easily form the metal member 2 having a smaller thermal expansion coefficient in the second direction by extrusion molding, or the like.

In addition, according to the composite material structure 1, by the adhesive resin 3 having thin walled portions 31, it is possible to strongly bond the metal member 2 and the resin members 4 at the thin walled portions 31. Furthermore, by periodically positioning the thin walled portions 31 in the second direction, the adhesive 3 functions as an anchor when curing, and it is possible to reduce warping of the composite material structure 1.

Modified Example

In the embodiment described above, an example of the metal member 2 was described in which the two surface sides of the main surface portions 21 are connected by connecting portions 23 at the end portions 22; however, the same action and effects as the composite material structure 1 can be exerted even if the cross-sectional shape of the metal member 2 is another shape.

Figure 6:
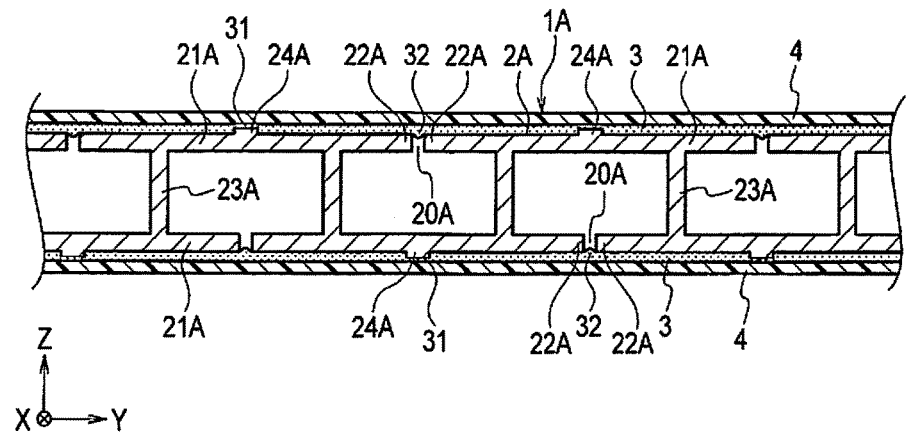
FIG. 6 is a cross-sectional view illustrating a modified example of the composite material structure according to the embodiment of the present invention.

A composite material structure 1A according to a modified example of the embodiment of the present invention comprises a metal member 2A, in which main surface portions 21A on both sides in the third direction are connected by connecting portions 23A that connect in locations away from end portions 22A of the main surface portions 21A, as illustrated in FIG. 6. The main surface portions 21A are disposed on each of the two surface sides of the metal member 2A in the third direction, such that the end portion 22A and the end portion 22A of another adjacent main surface portion 21A are each separated by a gap 20A. The connecting portions 23A are formed, for example, along the third direction.

In the same manner as the metal member 2, the metal member 2A is formed such that the thermal expansion coefficient in the first direction is larger than the thermal expansion coefficient in the second direction. In addition, the metal member 2A is formed such that the cross-sectional shape as viewed from the first direction is constant.

In FIG. 6, a case in which the connecting portions 23 are along the third direction is illustrated, but this is just an illustrative embodiment, and the connecting portions 23 can have inclinations with respect to the third direction as well. In this case, in the same manner as FIG. 3, etc., the directions in which the connecting portions 23 are tilted are preferably alternated in the second direction.

Other Embodiments

As described above, the present invention was described according to the illustrative embodiment described above; however, the discussion and drawings that constitute a portion of this disclosure should not be understood as limiting the present invention. From this disclosure, various alternative embodiments, examples, and operational techniques should be apparent to those skilled in the art.

Figure 7:
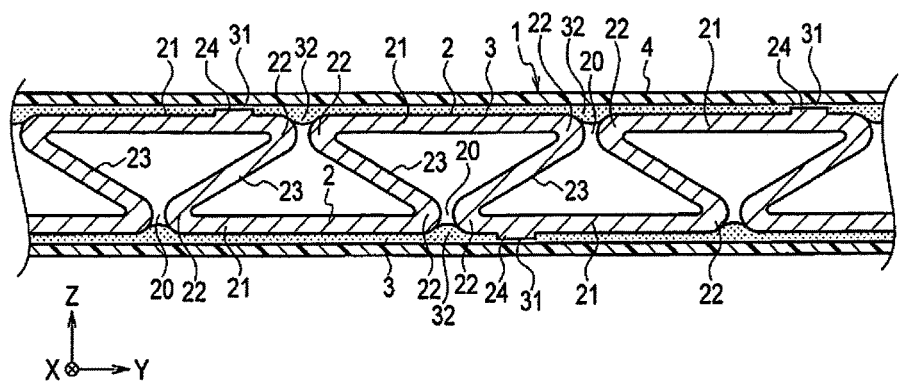
FIG. 7 is a cross-sectional view illustrating the composite material structure according to another embodiment of the present invention.

For example, in the embodiment described above, the thick walled portions 24 can be disposed displaced from the central portion of each main surface portion 21 in the second direction, as illustrated in FIG. 7. Additionally, it is not necessary for the pitch (pitch) at which the thick walled portions 24 and the thin walled portions 31 are arranged in the second direction to match the pitch of the main surface portions 21, as long as the portions are periodically positioned, as illustrated in FIG. 7.

Other than the above, it goes without saying that the present invention includes various embodiments not described herein, such as configurations in which the above-described configurations are applied to each other. Therefore, the technical scope of the present invention is determined only by the matter specifying the invention according to the claims that are pertinent to the description above.

According to the present invention, it is possible to provide a composite material structure capable of reducing the effect of the difference in the thermal expansion coefficients between metal and fiber-reinforced resin, by preferentially orienting the fibers of the fiber-reinforced resin along a direction in which the thermal expansion coefficient of the metal member is small.

The invention claimed is:

1. A composite material structure comprising:
 a metal member formed in a planar shape, the metal member having a main surface with a first thermal expansion coefficient in a first direction along the main surface that is larger than a second thermal expansion coefficient in a second direction along the main surface, the second direction being orthogonal to the first direction; and
 a resin member bonded to the main surface of the metal member, and made of fiber-reinforced resin having a fiber quantity along the second direction that is larger than a fiber quantity along the first direction.

2. The composite material structure according to claim 1, wherein
 the metal member is formed such that main surface is continuous in the first direction and discontinuous in the second direction.

3. The composite material structure according to claim 1, wherein
 the main surface of the metal member and the resin member are bonded to each other by an adhesive; and
 the adhesive has thin walled portions that are formed to have a smaller thickness than other portions of the adhesive.

4. The composite material structure according to claim 3, wherein
 the thin walled portions of the adhesive are periodically positioned in the second direction.

5. The composite material structure according to claim 2, wherein
 the main surface of the metal member and the resin member are bonded to each other by an adhesive; and
 the adhesive has thin walled portions that are formed to have a smaller thickness than other portions of the adhesive.

6. The composite material structure according to claim 2, wherein
 the main surface of the metal member and the resin member are bonded to each other by an adhesive; and
 the adhesive has thin walled portions that are formed to have a smaller thickness than other portions of the adhesive, the thin walled portions of the adhesive are periodically positioned in the second direction.

* * * * *